(12) United States Patent
Jobard et al.

(10) Patent No.: US 12,072,076 B2
(45) Date of Patent: Aug. 27, 2024

(54) LIGHT GUIDE ASSEMBLY FOR AN AUTOMOTIVE VEHICLE

(71) Applicant: VALEO VISION, Bobigny (FR)

(72) Inventors: Claire Jobard, Bobigny (FR); Pierre Bahin, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/546,367

(22) PCT Filed: Feb. 16, 2022

(86) PCT No.: PCT/EP2022/053828
§ 371 (c)(1),
(2) Date: Aug. 14, 2023

(87) PCT Pub. No.: WO2022/175332
PCT Pub. Date: Aug. 25, 2022

(65) Prior Publication Data
US 2024/0125450 A1    Apr. 18, 2024

(30) Foreign Application Priority Data
Feb. 19, 2021    (FR) ...................................... 2101625

(51) Int. Cl.
*F21S 43/243*    (2018.01)
*F21S 43/14*    (2018.01)
*F21S 43/249*    (2018.01)

(52) U.S. Cl.
CPC ............. *F21S 43/243* (2018.01); *F21S 43/14* (2018.01); *F21S 43/249* (2018.01)

(58) Field of Classification Search
CPC ........ F21S 43/243; F21S 43/249; F21S 43/14; F21S 43/237
See application file for complete search history.

(56) References Cited

U.S. PATENT DOCUMENTS 10,731,820 B2    8/2020    Martinez-Perez et al.

FOREIGN PATENT DOCUMENTS

CN    109163305 A  *  1/2019  ........... B60Q 1/2607
DE    202015008369 U1 *  4/2017  ........... B60Q 1/2607
(Continued)

OTHER PUBLICATIONS

European Patent Office, International Search Report and Written Opinion of corresponding International Application No. PCT/EP2022/053828, dated May 18, 2022.

*Primary Examiner* — Matthew J. Peerce
(74) *Attorney, Agent, or Firm* — Valeo Vision

(57) ABSTRACT

A light guide assembly for a vehicle, the light guide assembly including a light guide having a first end face. The light guide assembly further includes a first light source and a second light source having different heights and being mounted on a common support plane. Further, the first and second light sources are arranged to emit light rays in a light emission direction toward the first end face. The first end face includes a first inlet portion configured to receive light from the first light source and a second inlet portion configured to receive the light from the second light source. The first and second inlet portions are offset from one another in the light emission direction in such a way that the space between the common support plane and each inlet portion is proportional to the height of the light source in front of the corresponding inlet portion.

11 Claims, 4 Drawing Sheets

(56) References Cited

FOREIGN PATENT DOCUMENTS

| | | |
|---|---|---|
| DE | 102016111501 A1 | 12/2017 |
| EP | 2378323 A2 | 10/2011 |
| EP | 2775197 A1 | 9/2014 |
| EP | 3190334 A1 | 7/2017 |
| JP | 2005005211 A | 1/2005 |
| JP | 2016048625 A | 4/2016 |
| WO | 2016097322 A1 | 6/2016 |

* cited by examiner

LIGHT GUIDE ASSEMBLY FOR AN AUTOMOTIVE VEHICLE

TECHNICAL FIELD

The present invention relates to the field of automotive vehicles and particularly relates to a light guide assembly for automotive vehicles.

BACKGROUND OF THE INVENTION

It is well known to use a light guide for achieving a lighting and/or signaling function of an automobile. The light guide is a transparent or translucent part comprising a first end face at its proximal end, a second end face at its distal end opposite to the proximal end, and guiding part connecting the first end face with the second end face. The light rays propagate in a controlled manner in the light guide. In front of the first end face, there are one or more light sources, for example, Light Emitting Diodes (LEDs) are provided. The rays of the light emitted by the light source travel by several total internal reflections along the length of the light guide toward the exit face. Different types of light sources may be employed for performing different photometric functions. Further, it is well known to use a single light guide for performing several functions. For this, the lighting and/or signaling devices use light sources of different types corresponding to each function. For instance, one of the light sources may be arranged to emit a white light associated with the daylight photometric function and the other light source may be arranged to emit an amber colored light associated with the flashing direction indicator lamp photometric function.

However, the arrangement of different types of light sources relative to the first end face of the light guide is sensitive, and causes a loss of light intensity if one of the beams from one of the light source is not oriented correctly at the entrance of the light guide. Thus, when two or more light sources are arranged at the entrance of the light guide, it is necessary to correctly align the light sources in the axis of the input face of the light guide.

Further, different types of light sources are being manufactured with different packaging heights. When such light sources are arranged at the front of the light guide, this would further cause a loss of flux as the light source of higher packaging height would be nearer to the light entrance face of the light guide compared to the light source of the lower packaging height. Thereby, the light source of the higher packaging height may be well focalized compared to the light source of the lower packaging height. Thus, the quantity of light to be introduced by the light source of lower packaging height into the light guide is reduced. In other words, the coupling loss, which is loss of light that occurs when the light from the light emitting portion enters the light guide, increases. One solution is to use multiple branches of light guide at the first end face and a common exit face. However, it would require more space to accommodate the light guide in the lighting and/or signaling device and required to use more material to make such light guides.

SUMMARY OF THE INVENTION

One object of the present invention is to provide a lighting and/or signaling device having a light guide assembly, which can be used to perform at least two different photometric functions using a single light guide and different light sources having different packaging heights, without loss of flux.

Another object of the present invention is to provide a light guide whose configuration saves space in the lighting and/or signaling device and saves material used to make the light guide, while ensures multiple photometric functions.

Other object of the present invention is to improve aesthetic appearance of the lighting and/or signaling devices.

According to an embodiment of the present invention, there is provided a light guide assembly of a vehicle light module, the light guide assembly including:
  a light guide having a first end face, a second end face and
    a light guiding portion connecting the first end face and
    the second end face;
  a first light source and a second light source supported in
    a common support plane, the first end face being
    arranged opposite the first and second light sources so
    that the first and second light sources emit the light
    toward the first end face in an emission direction.

According to the invention, the first light source presents a first height measured along the emission direction, and the second light source presents a second height measured along the emission direction, the first height being inferior to the second height. Further, the first end face includes a first inlet portion configured to receive light from the first light source and a second inlet portion configured to receive the light from the second light source. The first and second inlet portions are offset from one another in the emission direction in such a way that the first inlet portion is located closer to the common support plane than the second inlet portion.

Thus, the space between the common support plane and each inlet portion in the light emission direction is proportional to the size, e.g. the height, of the light source in front of the corresponding inlet portion. Therefore, in accordance with the claimed invention, a single light guide with different configuration of its light inlet portion is used to perform different types of photometric functions irrespective of packaging heights of different types of light sources, which are used at the inlet of the light guide.

Further, according to the present configuration of the first end face, the distance between each light source and the first end face can be dimensioned to have an optimal transmission of the light rays emitted from said source to the entrance face of the light guide, i.e. transmission without too much loss of rays. Thereby, the loss of light in light transmission can be reduced or even suppressed. An efficient and stable light transmission can be realized with a simple configuration of forming multiple inlet portions at the first end face. Here, the first end face can be further called the inlet face that is facing the first and second light sources.

In addition, the light guide configuration of the present invention requires minimum space in the lighting and/or signaling device, thereby enlargement of light guide or use of multiple branches at the first end face for different types of light sources can be avoided to realize different photometric functions.

In an embodiment, the principal axis of the light guide corresponds to the longitudinal axis along which the light guide extends. The longitudinal axis is further called the main extension axis. In this case, the first end face is located at a first longitudinal end of the light guide while the second end face is located at a second longitudinal end of the light guide, opposite to the first longitudinal end.

In an embodiment, the first end face and the light guiding portion may have a same cross-section. This results in space saving in the lighting and/or signaling device and thus satisfies the space constraint requirements.

In an embodiment, the first inlet portion and/or the second inlet portion may be arranged substantially perpendicular to the light emission direction. This arrangement of inlet portions substantially perpendicular to the light emission direction allows receiving more amount of light from the light sources; thereby different photometric functions can be performed with high lighting efficiency.

In an embodiment, the first inlet portion may be positioned at a first distance, measured in the light emission direction, from the first light source; and the second inlet portion may be positioned at a second distance, measured in the light emission direction, from the second light source, the second distance being equal to the first distance plus or minus 0.5 mm, preferably plus or minus 0.3 mm. Preferably the second distance is substantially equal to the first distance. By "substantially equal", we mean an equality to within +/−5%. Thus, the coupling losses from both the light sources would be substantially equal. Thereby, the quantity of light to be introduced into the light guide by both the light sources would be substantially same irrespective of their packaging heights.

In an embodiment, the first end face may include further a connection portion connecting the first inlet portion and the second inlet portion to each other.

In an embodiment, the connecting portion may include a face oriented parallelly to the light emission direction to form a stepped first end face.

In another embodiment, the connecting portion may be arranged in a slanting manner with respect to the light emission direction to connect the first and second inlet portions to form the stepped first end face. This configuration of the first end face aids in easy demoulding during the manufacture of the light guide. However, the operation and performance of light guides having two different configurations of the first end face remains substantially same.

In an embodiment, the first light source may be configured to perform a first photometric function and the second light source is configured to perform a second photometric function different from the first photometric function. The first light source and/or the second light source include(s) one or more Light Emitting Diodes (LEDs). For example, the first photometric function corresponds to turn indicator photometric function and the second photometric function corresponds to stop photometric function.

In an embodiment, the first light source and the second light source may be mounted on a light source support, and the light guide assembly may further include a fastening means joining the light guide to the light source support.

In an embodiment, the first light source and the second light source may be mounted on a light source support. The light guide assembly includes an additional part to which is fixed the light source support. The light guide assembly may further include a fastening means joining the light guide to the additional part.

In an embodiment, the fastening means may include a fool-proof system allowing a positioning of the first inlet portion in front of the first light source and the second inlet portion in front of the second light source.

The first and second light sources are mounted on a primary face of the light source support, the common support plane passing through this primary face.

In an embodiment, the fasting means includes two integrally formed ribs, each rib including a first part protruding from a periphery of a sidewall of the light guiding portion, and a second part extending parallel to the light guiding portion, the second part being fixed to the light source support at corresponding fixed points. The first light source and the second light source are arranged between the first fixed point, the second fixed point, and the first end face of the light guide. The first fixed point is at a third distance from the first light source and the second fixed point is at a fourth distance from the second light source. The third distance is not equal to the fourth distance to avoid collision between the light guide inlet face and the light sources during assembly. Thus, the fastening means ensure that the light guide can be positioned stably and an optimal distance can be maintained between the light guide and a light source. Thereby, the optical efficiency of the lighting device and/or signaling device can be enhanced, while providing stable light emission.

In an embodiment, the light guide may be configured to convey the light from the first end face to the second end face. Thus, the second end face forms an outlet face.

In another embodiment, the light guide includes an outlet face disposed at an angle with respect to the first end face and/or the second end face. Further, the light guiding portion is arranged so as to at least partially reflect light rays emitted by the first light source and/or by the second light source towards the outlet face in a direction perpendicular to the direction of the light emission direction. For example, the outlet face is formed by a lateral face of the light guide. Said lateral face can be a portion of lateral wall forming the light guiding portion. The light guide may include a plurality of prisms configured for reflecting light rays towards the outlet face.

In another embodiment, the second end face and at least part of the lateral face of the light guide can be both the outlet face.

The present invention further relates to a vehicle light module comprising the above-described light guide assembly. Notably, the vehicle light module can be mounted in a projector of the vehicle. The projector can be a tail light of the trunk, notably a tail light extending all along the trunk.

The present invention also relates to a vehicle, and in particular an automotive vehicle, comprising the above-described a light guide assembly. A vehicle may include a self-driving vehicle or a vehicle driven by a human being for the transportation of human beings, animals or objects.

Thus, the light guide of the present invention is adapted to suppress the loss of flux when different types of light sources having two different packaging heights are provided at the light guide entrance.

BRIEF DESCRIPTION OF DRAWINGS

To complete the description and to provide a better understanding of the invention, a set of drawings is provided. Said drawings form an integral part of the description and illustrate an embodiment of the invention, which should not be construed as restricting the scope of the invention, but only as an example of how the invention can be carried out. The drawings comprise the following characteristics.

FIG. 1c shows (1) a side view of a light entrance face of a light guide of the light guide assembly shown in the FIG. 1a and (2) a front view of a light entrance face of a light guide of the light guide assembly shown in the FIG. 1a.

FIG. 2 shows an exemplary embodiment of the light guide assembly shown in the FIG. 1a.

FIG. 3b shows a side view of a light entrance face of a light guide of the light guide assembly shown in the FIG. 3a.

FIG. 4 shows an exemplary embodiment of the light guide assembly shown in the FIG. 3a.

DETAILED DESCRIPTION OF THE INVENTION

Figure 1A:
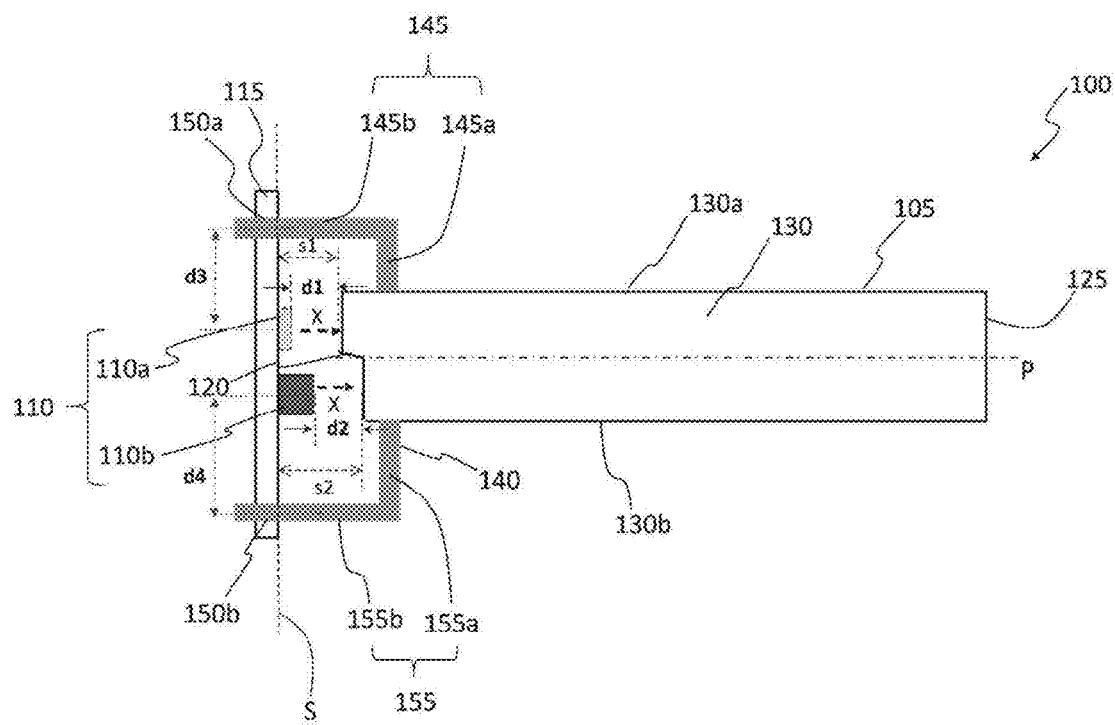
FIG. 1a shows a side view of a light guide assembly, according to an embodiment of the present invention.

Embodiments of the present application will below be explained in details by ways of examples with reference to the accompanied drawings. Throughout the description, same or similar reference numerals represent same or similar parts. The following description of the embodiments with reference to the drawings is intended to explain the general inventive concept of the present application, instead of limiting to the present invention.

In the following detailed description, for purposes of explanation, numerous specific details are set forth in order to provide a thorough understanding of the disclosed embodiments. It will be apparent, however, that one or more embodiments may be practiced without these specific details.

The light guide assembly of the present embodiments may be used in light module intended to be mounted in a vehicle lamp of an automotive vehicle. For instance, the light guide assembly of the present embodiments may be used in a rear lamp of an automotive vehicle.

Figure 1B:
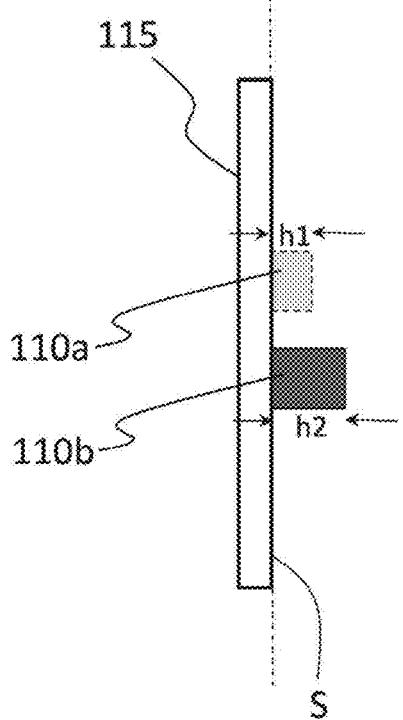
FIG. 1b shows a light source support of the light guide assembly shown in the FIG. 1a, according to an embodiment of the present invention.
Figure 1C:
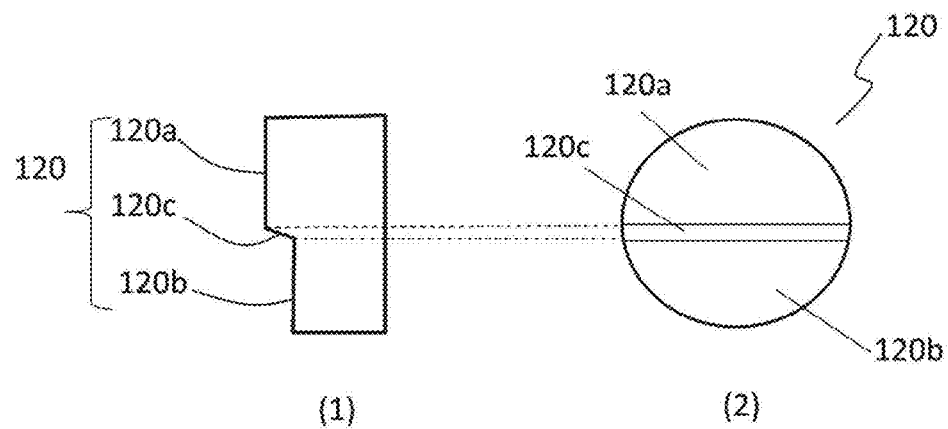

FIG. 1a shows a light guide assembly 100, according to an embodiment of the present invention. FIG. 1b shows a light source support of the light guide assembly shown in the FIG. 1a, according to an embodiment of the present invention. FIG. 1c includes a FIG. 1c (1) showing a side view of a light entrance face of a light guide of the light guide assembly shown in the FIG. 1a. FIG. 1c further includes a FIG. 1c (2) showing a front view of a light entrance face of a light guide of the light guide assembly shown in the FIG. 1a.

The light guide assembly 100 shown in the FIG. 1a comprises a light guide 105, a light source unit 110, and a light source support 115 carrying the light source unit 110 as shown in the FIG. 1a.

In the light guide assembly shown in the FIG. 1a, the light source unit 110 includes a first light source 110a and a second light source 110b different from the first light source 110a. Although single light source of different types are illustrated in the present embodiment, it is understood to a person skilled in the art, the light source unit 110 can include plurality of different types of light sources and notably depends on the dimensions of the light guide, number of photometric functions to be performed, and required luminous intensity.

Here, the light sources 110a and 110b are supported by the light source support 115. In other words, the lights sources 110a and 110b are mounted on a primary face of the support 115, the primary face being in a common support plane S. Further, the light sources are disposed at a predetermined point with respect to the light guide 105.

For example, the light sources 110a and 110b are semiconductor photo emissive elements adapted to generate light rays by photoluminescence such as light emitting diodes. The light sources are solid-state light sources. The term "solid state light source" throughout refers to one or more light emitting diodes (LEDs), organic light emitting diodes (OLEDs), polymer light emitting diodes (PLEDs), organic light emitting compounds (OLECs), and other semiconductor-based light sources, including combinations thereof, whether connected electrically in series, parallel, or combinations thereof. Light sources 110a and 110b are preferably light-emitting diodes (LEDs). As a variant, the light sources 110a and 110b can be formed by a chip of the same so called multi-chip light emitting diode.

In the example described, the light guide 105 is monolithic, in other words, formed from a single piece, for example by molding. Further, the light guide 105 is of elongated shape in the example described. However, the light guide 105 may have a circular, elliptical, square, oval or even more complex cross section, and the light guide 105 is based on transparent polycarbonate polymer or polymethylmethacrylate PMMA, or other suitable polymer. Further, the light guide 105 can be a flat light guide or a curved light guide.

The light guide 105 shown in the FIG. 1a comprises a proximal end located close to the light sources 110a, 110b, and a distal end remote from these light sources.

Here, the light guide 105 includes a first end face 120, a second end face 125, and a light guiding portion 130 connecting the first end face 120 and the second end face 125.

The first end face 120 is disposed at the proximal end of the light guide and the second end face 125 is disposed at the distal end opposite to the proximal end. Here, the first end face 120 can be further called the inlet face.

The first end face 120 is placed in front of the first light source 110a and the second light source 110b in such a way that the light emitted from the first and second light sources are directed towards the first end face in a light emission direction X.

In the illustrated embodiment, the first end face 120 and the light guiding portion 130 have a same cross-section or substantially same cross section. However, it is understood to a person skilled in the art that the present invention is not limited to the light guides in which the first end face 120 and the light guiding portion 130 having same cross-section.

Here, the light guide 105 is having a cylindrical form. The light guiding portion 130 presents an elongated form and includes a lateral wall divided, here, into two parts 130a, 130b.

As shown in the FIG. 1a, the light guide 105 includes a principal axis P passing through the first end face 120 and the second end face 125. Specifically, in this embodiment, the principal axis P passing through the center of each of the first and second end faces. Here, the principal axis P corresponds to the longitudinal axis along which the light guide extends. In the illustrated embodiment, the principal axis P extends parallel to the light emission direction X.

Light entering the light guide 105 may be transmitted in accordance with principles of total internal reflection (TIR).

The light guide 115 may be configured to transmit light emitted by the light sources 110a, 110b from the first end face 120 to the second end face 125 via the light guiding portion 130. The light guide 105 may be configured to propagate light rays in a direction of the principal axis P.

Complementary or alternatively, the light guide may be configured to reflect the light toward a lateral face of the light guide. For example, this lateral face is part of lateral wall of the light guiding portion. To this end, the light guide includes a plurality of prisms that reflect light rays toward the lateral face in a direction perpendicular to the light emission direction X.

In the illustrated embodiment, when the light sources 110 and 110b are mounted on the light source support 115, the first light source 110a having a first height h1 measured along the light emission direction X, and a second light source 110b having a second height h2 measured along the light emission direction X.

In this example, the first height h1 is less than the second height h2. Further, the first light source 110a is capable of emitting light of first color, and the second light source 110b is capable of emitting light of second color different from the first color.

In the illustrated embodiment, the first end face 120 is divided into different inlet portions. As shown in the FIG. 1c, the first end face 120 includes a first inlet portion 120a and a second inlet portion 120b. In other words, a portion of the surface of the first end face 120 forms the first inlet portion 120a. Another portion of the surface of the first end face 120 forms the second inlet portion 120b.

In the embodiment described in FIG. 1a, there are two inlet portions 120a, 120b. However, it will be understood that the present invention is not limited to two inlet portions, the first end face 120 can also have more than two inlet portions depending on the number of photometric functions to be performed and the dimensions of the light guide 100. The first inlet portion 120a and the second inlet portion 120b correspond in position to the first light source 110a and the second light source 110b, respectively. In other words, the first inlet portion 120a is configured to receive light from the first light source 110a while the second inlet portion 120b is configured to receive the light from the second light source 110b.

As can be seen from the FIG. 1a, the first inlet portion 120a and the second inlet portion 120b are arranged substantially perpendicular to the light emission direction X. The first and second inlet portions 120a, 120b are offset from one another in the light emission direction X. Stated differently, the first and second inlet portions 120a, 120b are not arranged at the same level along the light emission direction X with the support plane S as reference.

Further, the space between the common support plane S and each inlet portion 120a or 120b in the X-direction is proportional to the size, in this case the height, of the light source in front of the inlet portion in question. In this embodiment, the first inlet portion 120a is located closer to the common support plane S than the second inlet portion 120b because the first light source 110a is smaller than the second light source 110b.

As illustrated in the FIG. 1a, the distance s1 between the first inlet portion 120a and the common support plane S, measured along the X-direction, is less than the distance s2 between the second inlet portion 120b and the common support plane S measured in the same X-direction.

The first inlet portion 120a is positioned at a first distance d1, measured in the light emission direction X, from the first light source 110a. The second inlet portion 120b is positioned at a second distance d2, measured in the light emission direction X, from the second light source 110b. The first distance d1 is same as the second distance d2 such that there loss of light from both the light sources 110a, 110b can be minimized. Alternatively, the second distance d2 could be equal to the first distance d1 plus or minus 0.5 mm, preferably plus or minus 0.3 mm.

Here, the first light source 110a will be activated to implement the first photometric function. In the example described, the first photometric function is a tail photometric function. The second light source 110b will be activated to perform a second photometric function. For example, the second photometric function is a turn indicator photometric function.

In the illustrated embodiment shown in the FIG. 1a, a connecting portion 120c which includes wall or a face connects the first and second inlet portions 120a and 120b to each other. The connecting portion 120c is arranged in a slanting manner with respect to the light emission direction X to connect the first and second inlet portions 120a, 120b to form a stepped first end face.

The light guide assembly 100 further comprises a fastening means 140 to join the light guide 100 to the light source support 115. The fastening means includes 140 a fool-proof system allowing a positioning of the first inlet portion 120a in front of the first light source 110a and the second inlet portion 120b in front of the second light source 110b.

In this embodiment, the fasting means 140 includes two integrally formed ribs 145, 155. Each rib 145, 155 including a first part 145a, 155a protruding from a periphery of lateral wall parts 130a, 130b of the light guiding portion 130, and a second part 145b, 155b extending in the direction of the principal axis P. The second part 145b, 155b being fixed to the light source support 115 at a corresponding fixed point 150a, 150b, as shown in the FIG. 1a. The fixed point 150a, 150b is a location or a contact zone between the rib 145, 155 and the light source support 115. Here, the contact is made by the engagement of each second part 145b, 155b to a corresponding hole in the support 115.

As can be seen from the FIG. 1a, the first light source 110a and the second light source 110b are arranged between the first fixed point 150a, the second fixed point 150b, and the first end face 120 of the light guide 105. The first fixed point 150a is at a third distance d3 from the first light source 110a and the second fixed point 150b is at a fourth distance d4 second light source 110b. The third and fourth distances are measured along a direction perpendicular to the light emission direction X.

Here, the third distance d3 is not equal to the distance d4 to avoid collision between the first end face 120 and the light sources 110a, 110b during assembly.

Figure 2:
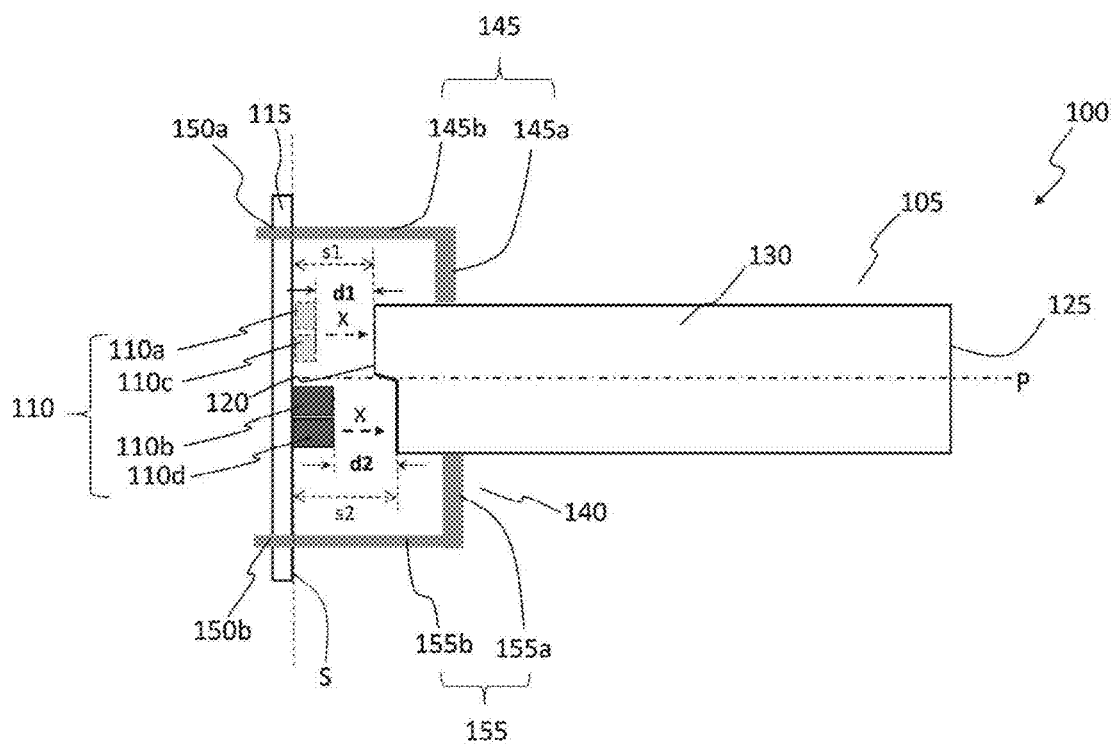

FIG. 2 shows an exemplary embodiment of the light guide assembly shown in the FIG. 1a. The light guide assembly shown in the FIG. 2 includes a light guide 105, a light source unit 110, a light source support 115 disposed carrying the light source unit 110, and a fastening means 140 to join the light guide 100 to the light source support 115. The structure of the light guide 100 and the fastening means 140 shown in the FIG. 2 are same as the structure of the light guide 100 and the fastening means 140 shown in the FIG. 1a. However, in the exemplary embodiment shown in the FIG. 2, the light source support 115 is mounted with two first light sources 110a, 110c having the first height h1 to perform the first photometric function, and two-second light sources 110b, 110d having the second height h2 to perform the second photometric function. During the implementation of the first photometric function, both the first light sources 110a, 110c will be turned ON. Further, during the implementation of the second photometric function, both the second light sources 110b, 110d will be turned ON.

Figure 3A:
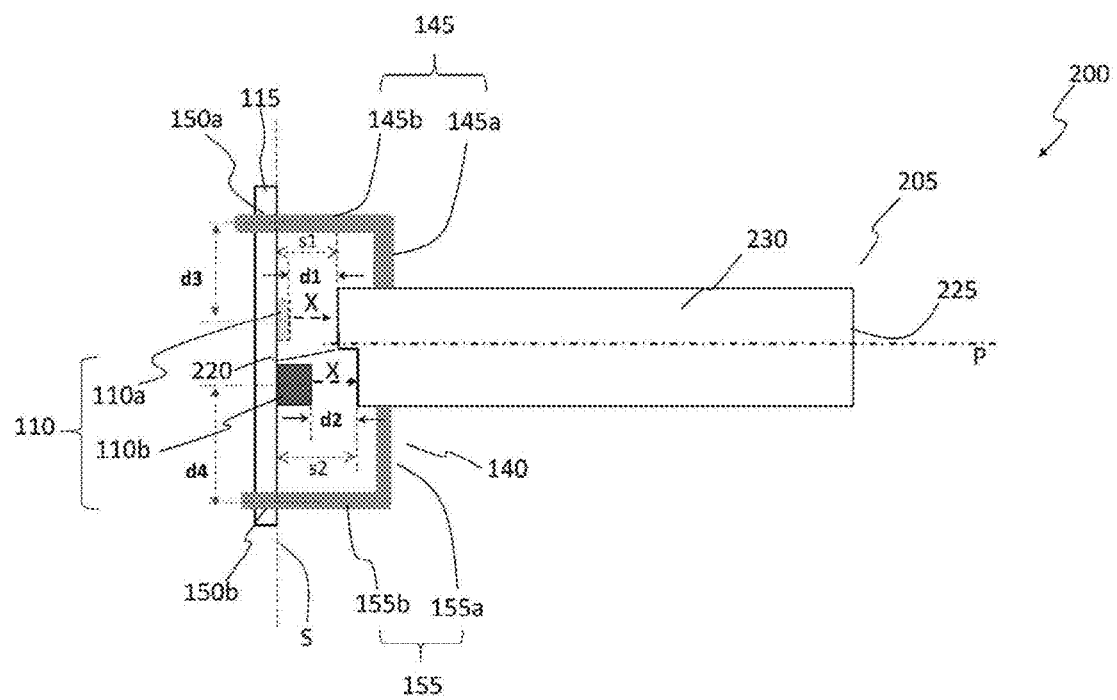
FIG. 3a shows a side view of a light guide assembly, according to another embodiment of the present invention.
Figure 3B:
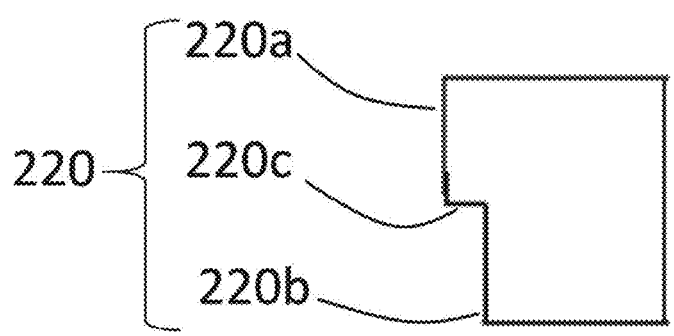

FIG. 3a shows a side view of a light guide assembly, according to another embodiment of the present invention. FIG. 3b shows a side view of a light entrance face of a light guide of the light guide assembly shown in the FIG. 3a. The light guide assembly 200 shown in the FIG. 2 includes a light guide 205, a light source unit 110, a light source support 115 disposed substantially parallel to the light guide to carry the light source unit 110, and a fastening means 140 to join the light guide 100 to the light source support 115. The light source unit 110, light source support 115, and the fastening means 140 illustrated in the FIG. 3*a* is same as the light source unit 110, light source support 115, and the fastening means 140 illustrated in the FIG. 1*a*, and hence herein not discussed in detail. The light guide 205 shown in the FIG. 3*a* comprises a first end face 220 in front of which the light sources 110*a*, 110*b* are arranged, a second end face 225, and an elongated light guiding portion 130 connecting the first end face 220 and the second end face 225.

In the illustrated embodiment shown in the FIG. 3*a*, the first end face 220 is divided into different inlet portions. As shown in the FIG. 3*b*, the first end face 220 includes a first inlet portion 220*a* and a second inlet portion 220*b*. The first inlet portion 220*a* and the second inlet portion 220*b* correspond in position to the first light source 110*a* and the second light source 110*b*, respectively, mounted on the light source support 115.

As can be seen from the FIG. 3*b*, the first inlet portion 220*a* and/or the second inlet portion 220*c* are arranged substantially perpendicular to the light emission direction X. The first and second inlet portions 220*a*, 220*b* are offset from one another in the light emission direction X in such a way that the first inlet portion 220*a* is located closer to the common support plane S than the second inlet portion 220*b*.

In the same way as the first embodiment, here, the distance s1 between the first inlet portion 220*a* and the common support plane S, measured along the light emission direction X, is less than the distance s2 between the second inlet portion 220*b* and the common support plane S, also measured along the X-direction.

A connecting portion 220*b* connects the first and second inlet portions 220*a*, 220*b* to each other, which is like a face or a wall. In this embodiment, the connecting portion 220*c* includes a face oriented parallel to the light emission direction X to form a stepped first end face. In the light guide as configured, the surface forming the first end face 220 includes a protrusion seen from the outside, i.e. from the light source unit 110. Here, the protrusion includes the first inlet portion 220*a*.

The first inlet portion 220*a* is positioned at a first distance d1, measured in the light emission direction X, from the first light source 110*a*. The second inlet portion 220*b* is positioned at a second distance d2, measured in the light emission direction X, from the second light source 110*b*. The first distance d1 is same as the second distance d2 such that there loss of light from both the light sources 110*a*, 110*b* can be minimized and can have substantially same lighting efficiency. Alternatively, the second distance d2 could be equal to the first distance d1 plus or minus 0.5 mm, preferably plus or minus 0.3 mm. The first inlet portion 220*a* is configured to receive light from the first light source 110*a* and guided towards the second end face 225 via the light guiding portion 230 to perform a first photometric function. The second inlet portion 220*b* configured to receive the light from the second light source 110*b* and guided towards the second end face 225 via the light guiding portion 230 to perform a second photometric function.

Figure 4:
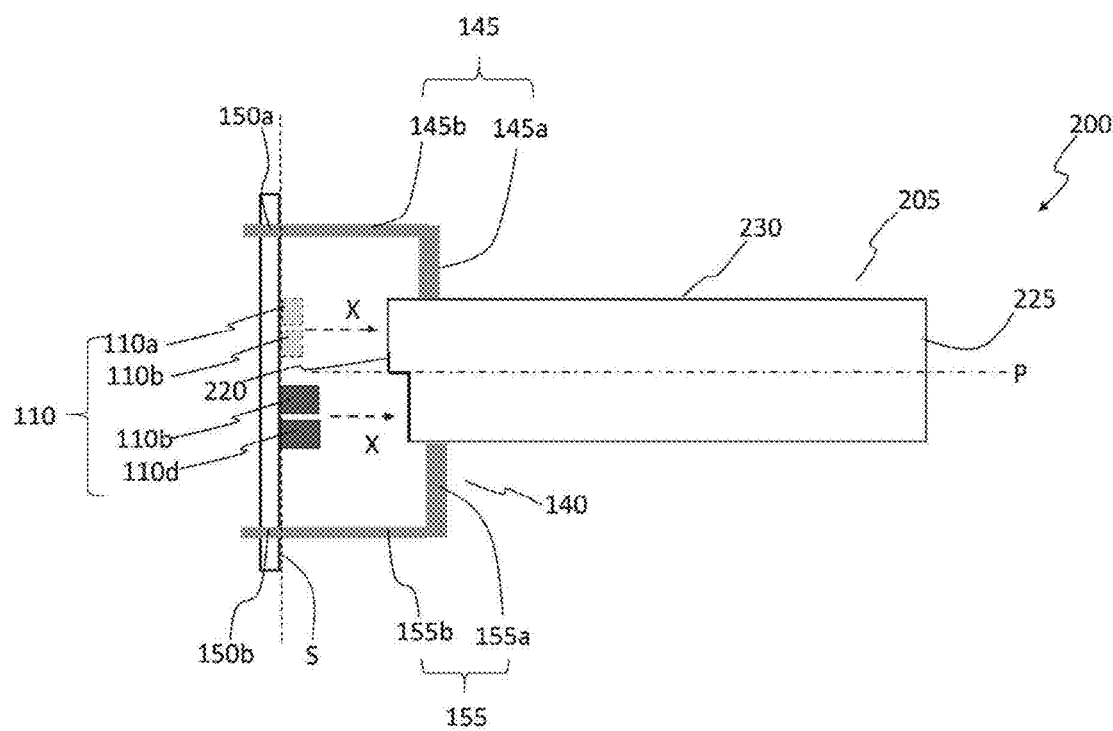

FIG. 4 shows an exemplary embodiment of the light guide assembly shown in the FIG. 3*a*. The light guide assembly shown in the FIG. 4 includes a light guide 205, a light source unit 110, a light source support 115 disposed substantially parallel to the light guide 205 to carry the light source unit 110, and a fastening means 140 to join the light guide 100 to the light source support 115. The structure of the light guide 100 and the fastening means 140 shown in the FIG. 4 are same as the structure of the light guide 100 and the fastening means 140 shown in the FIG. 3*a*. However, in the exemplary embodiment shown in the FIG. 4, the light source support 115 is mounted with two first light sources 110*a*, 110*c* having the first height h1 to perform the first photometric function, and two-second light sources 110*b*, 110*d* having the second height h2 to perform the second photometric function.

The present invention further relates to a vehicle lamp comprising the above described light guide assembly 100, 200 the light guide support, a main bezel, an outer lens, and a housing (not shown in the Figures).

Thus, in accordance with the claimed invention, a single light guide with different configuration of its light entrance portion is used to perform different types of photometric functions irrespective of packaging heights of different types of light sources, which are used at the entrance of the light guide. Further, according to the present configuration of the first end face, the distance between each light source and the first end face can be optimized so that a maximum of emitted light from the light source can enter the light guide via the first end face. Thereby, the loss of light in light transmission can be suppressed and efficient and stable light transmission can be realized with a simple configuration of forming multiple first end portions at the first end face. In addition, the light guide configuration of the present invention requires minimum space in the lighting and/or signaling device, thereby enlargement of light guide or use of multiple branches at the first end face for different types of light sources can be avoided to realize different photometric functions. In addition, the fastening means ensure that the light guide can be positioned stably and an optimal distance can be maintained between the light guide and a light source. Thereby, the optical efficiency of the lighting device and/or signaling device can be enhanced, while providing stable light emission.

The person skilled in the art realizes that the present invention by no means is limited to the preferred embodiments described above. On the contrary, many modifications and variations are possible within the scope of the appended claims. Also, the skilled person readily realizes that the different embodiments described herein may be combined freely to obtain new combinations.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantages.

What is claimed is:

1. A light guide assembly of a vehicle light module, the light guide assembly comprising:
    a light guide having a first end face, a second end face and a light guiding portion connecting the first end face and the second end face;
    a first light source and a second light source supported in a common support plane, the first end face being arranged opposite the first and second light sources so that the first and second light sources emit the light toward the first end face in a light emission direction;
    wherein
      the first light source presents a first height measured along the light emission direction, and the second light source presents a second height measured along the light emission direction, the first height being inferior to the second height; and the first end face includes a first inlet portion configured to receive light from the first light source and a second inlet portion configured to receive the light from the second light source, wherein the first and second inlet portions are offset from one another in the light emission direction in such a way that the first inlet portion is located closer to the common support plane than the second inlet portion.

2. The light guide assembly as claimed in claim 1, wherein the first end face and the light guiding portion have a same cross-section.

3. The light guide assembly as claimed in claim 1, wherein the first inlet portion and/or the second inlet portion are arranged substantially perpendicular to the light emission direction.

4. The light guide assembly as claimed in claim 1, wherein:
the first inlet portion is positioned at a first distance, measured in the light emission direction, from the first light source; and
the second inlet portion is positioned at a second distance, measured in the light emission direction, from the second light source,
wherein distance is equal to the first distance.

5. The light guide assembly as claimed in claim 1, wherein the first end face includes further a connection portion connecting the first inlet portion and the second inlet portion to each other.

6. The light guide assembly as claimed in claim 5, wherein the connecting portion is arranged in a slanting manner with respect to the light emission direction to connect the first and second inlet portions.

7. The light guide assembly as claimed in claim 1, wherein the first light source is configured to perform a first photometric function and the second light source is configured to perform a second photometric function different from the first photometric function.

8. The light guide assembly as claimed in claim 1, wherein the light guide includes an outlet face disposed at an angle with respect to the first end face and/or the second end face, and wherein the light guiding portion is arranged so as to at least partially reflect light rays emitted by the first light source and/or by the second light source towards the outlet face in a direction perpendicular to the light emission direction.

9. The light guide assembly as claimed in claim 1, wherein the first light source and the second light source are mounted on a light source support, and wherein the light guide assembly further comprises fastening means joining the light guide to the light source support.

10. The light guide assembly as claimed in claim 1, wherein the fastening means includes a fool proof system allowing a positioning of the first inlet portion in front of the first light source and the second inlet portion in front of the second light source.

11. A vehicle light module comprising:
a light guide assembly, with the light guide having a first end face, a second end face and a light guiding portion connecting the first end face and the second end face;
a first light source and a second light source supported in a common support plane, the first end face being arranged opposite the first and second light sources so that the first and second light sources emit the light toward the first end face in a light emission direction;
wherein
the first light source presents a first height measured along the light emission direction and the second light source presents a second height measured along the light emission direction, the first height being inferior to the second height; and
the first end face includes a first inlet portion configured to receive light from the first light source and a second inlet portion configured to receive the light from the second light source, wherein the first and second inlet portions are offset from one another in the light emission direction in such a way that the first inlet portion is located closer to the common support plane than the second inlet portion.

* * * * *

UNITED STATES PATENT AND TRADEMARK OFFICE
CERTIFICATE OF CORRECTION

| | | |
|---|---|---|
| PATENT NO. | : 12,072,076 B2 | Page 1 of 1 |
| APPLICATION NO. | : 18/546367 | |
| DATED | : August 27, 2024 | |
| INVENTOR(S) | : Claire Jobard and Pierre Bahin | |

It is certified that error appears in the above-identified patent and that said Letters Patent is hereby corrected as shown below:

In the Claims

In Claim 5, Column 11, Line 28, replace, ". . . includes further a connection . . ." with -- . . . includes a connection . . . --

In Claim 10, Column 12, Line 11, replace, ". . . as claimed in claim 1, . . ." with -- . . . as claimed in claim 9, . . . --

Signed and Sealed this
Twenty-eighth Day of October, 2025

John A. Squires
*Director of the United States Patent and Trademark Office*